(12) United States Patent  
Grussmann

(10) Patent No.: US 9,097,181 B2  
(45) Date of Patent: Aug. 4, 2015

(54) TURBINE HOUSING OF AN EXHAUST-GAS TURBOCHARGER

(75) Inventor: Elmar Grussmann, Altenbeken-Buke (DE)

(73) Assignee: BENTELER AUTOMOBIL TECHNIK GMBH, Paderborn (DE)

( * ) Notice: Subject to any disclaimer, the term of this patent is extended or adjusted under 35 U.S.C. 154(b) by 648 days.

(21) Appl. No.: 13/455,813

(22) Filed: Apr. 25, 2012

(65) Prior Publication Data

US 2012/0294709 A1  Nov. 22, 2012

(30) Foreign Application Priority Data

May 19, 2011 (DE) .......................... 10 2011 050 506

(51) Int. Cl.
| F04D 29/42 | (2006.01) |
|---|---|
| F02C 6/12 | (2006.01) |
| F01D 25/24 | (2006.01) |
| F01D 9/02 | (2006.01) |
| F02B 37/02 | (2006.01) |

(52) U.S. Cl.
CPC . *F02C 6/12* (2013.01); *F01D 9/026* (2013.01); *F01D 25/243* (2013.01); *F02B 37/025* (2013.01); *F04D 29/4206* (2013.01); *F05D 2220/40* (2013.01); *F05D 2230/51* (2013.01); *F05D 2260/36* (2013.01); *Y02T 10/144* (2013.01)

(58) Field of Classification Search
CPC .................................................. F04D 29/4206

USPC ....................................................... 415/215.1
See application file for complete search history.

(56) References Cited

U.S. PATENT DOCUMENTS

| 5,908,486 | A | * | 6/1999 | Flinn et al. ...................... 75/232 |
|---|---|---|---|---|
| 7,198,459 | B2 | | 4/2007 | Grussmann |
| 2010/0074744 | A1 | * | 3/2010 | Phillips et al. ............. 415/208.1 |
| 2010/0098533 | A1 | * | 4/2010 | Grussmann et al. .......... 415/203 |
| 2010/0316494 | A1 | * | 12/2010 | Gru mann et al. ............ 415/231 |
| 2011/0131985 | A1 | | 6/2011 | Grussmann |
| 2011/0236191 | A1 | | 9/2011 | Grussmann |
| 2011/0286837 | A1 | * | 11/2011 | Smatloch et al. .......... 415/170.1 |
| 2011/0308238 | A1 | | 12/2011 | Grussmann |
| 2012/0023928 | A1 | | 2/2012 | Grussmann |

FOREIGN PATENT DOCUMENTS

| DE | 100 22 052 | 3/2001 |
|---|---|---|
| DE | 10 2008 052 552 | 4/2010 |
| DE | 10 2009 025 054 | 12/2010 |
| DE | 10 2010 021 114 | 11/2011 |
| JP | 2011-069364 | 4/2011 |

* cited by examiner

*Primary Examiner* — Nathaniel Wiehe
*Assistant Examiner* — Michael Sehn
(74) *Attorney, Agent, or Firm* — Henry M. Feiereisen LLC

(57) ABSTRACT

A turbine housing of an exhaust-gas turbocharger includes an outer housing, an inner housing, and a tubular fitting which is formfittingly connected to the inner housing and has a flange collar for attachment of a bearing case of a turbine wheel. The inner housing traverses the fitting and has an end portion which is bent radially outwards about the flange collar. A press ring is arranged upon the end portion for additional securement of the inner housing in place.

25 Claims, 1 Drawing Sheet

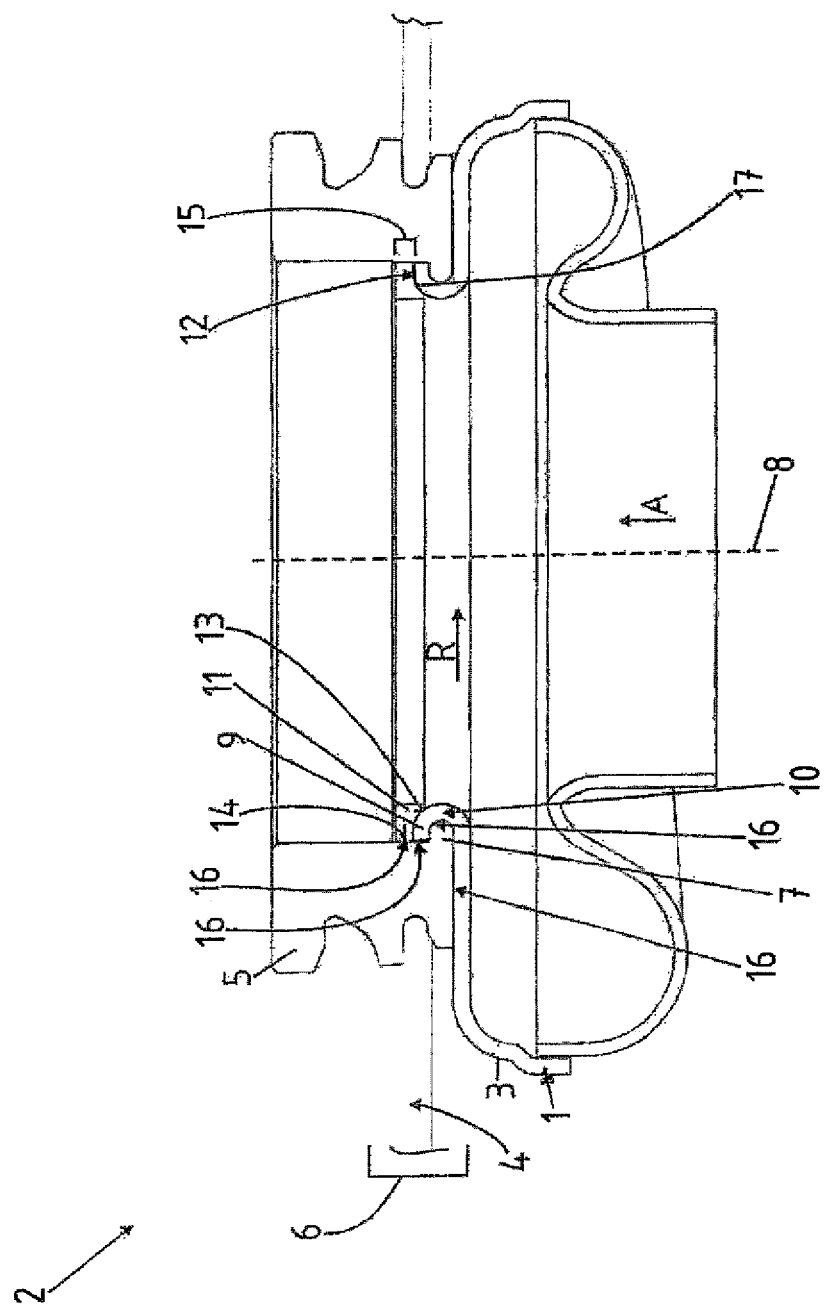

TURBINE HOUSING OF AN EXHAUST-GAS TURBOCHARGER

CROSS-REFERENCES TO RELATED APPLICATIONS

This application claims the priority of German Patent Application, Serial No. 10 2011 050 506.7, filed May 19, 2011, pursuant to 35 U.S.C. 119(a)-(d), the content of which is incorporated herein by reference in its entirety as if fully set forth herein.

BACKGROUND OF THE INVENTION

The present invention relates to a turbine housing of an exhaust-gas turbocharger.

The following discussion of related art is provided to assist the reader in understanding the advantages of the invention, and is not to be construed as an admission that this related art is prior art to this invention.

Combustion engines, in particular for use in motor vehicles, are increasingly charged using turbo machines so as to improve efficiency while maintaining engine capacity. As a result, the performance can be increased or less fuel is consumed and thus less $CO_2$ emission is produced while maintaining the performance.

In engine development, a supercharging machine or a turbo machine, in particular a turbocharger, is suited to the power characteristics of a motor at hand. In order for the turbocharger to operate at high efficiency, exact gap dimensions of individual structural parts have to be maintained before, during and after operation. Temperature differences of up to several 100° C. are encountered between various operating conditions, causing the various structural parts and used materials as well as material thicknesses to undergo expansions which deviate from one another. In the event of an expansion, gap dimensions change between the individual structural parts so that the presence of an unwanted blow-by effect within the turbocharger may be encountered. This adversely affects efficiency. In addition, structural parts may come into contact with one another as a result of different expansions. In a worst case scenario, the structural parts collide, causing damage or a total breakdown of the turbocharger.

Another important factor in automobile construction relates to weight which should be reduced for all materials and components. Manufacturers strive therefore to optimize weight for a turbocharger, in particular of the turbocharger housing in sheet-metal construction, so as to be able to optimize weight during production of an exhaust-gas turbocharger.

German Pat. No. DE 100 22 052 A1 proposes a decoupling of exhaust-conducting components and supporting and sealing outer structures. While the exhaust-conducting components of a turbocharger are exposed to high thermal stress and thus glow during operation, the thermal stress on the sealing outer structure is markedly less. However, also the outer housing is subject to very high thermal stress and flow-based stress especially in the regions of attachment onto the bearing case of a turbocharger and also at the inflow sides of the relatively hot exhausts.

The inner housing normally rests against the bearing flanges or is additionally coupled with the bearing flanges by a material joint. When the inner housing rests on the bearing flanges, different thermal expansion coefficients may cause leakage and thus may cause a blow-by. When implementing a coupling through a material joint, the heat impact zone of the thermal joining process is weakened in terms of geometry and material as a consequence of the thermal joining process. This region may encounter crack formation and thus also fatigue fracture or leakage under extreme stress conditions or during the operating life of a turbocharger.

It would be desirable and advantageous to provide an improved exhaust-gas turbocharger to obviate prior art shortcomings.

SUMMARY OF THE INVENTION

According to one aspect of the present invention, a turbine housing of an exhaust-gas turbocharger includes an outer housing, an inner housing, a tubular fitting formfittingly connected to the inner housing and having a flange collar for attachment of a bearing case of a turbine wheel, with the inner housing traversing the fitting and having an end portion bent radially outwards about the flange collar, and a press ring arranged upon the end portion for additional positional fixation of the inner housing upon the flange collar.

As a result of a provision of the press ring in accordance with the present invention, the sheet metal material of the inner housing which has been bent radially outwards is prevented from rebounding so that an optimal seat is realized between fitting and inner housing during production. In addition, the press ring prevents the inner housing and fitting from moving relative to one another as a result of different thermal expansions as caused by different material thicknesses and possibly by different materials. The press ring also provides a frictional engagement between the outwardly bent end portion of the inner housing and the flange collar. As a result, the press ring increases pressure tightness, thereby substantially preventing a blow-by effect. Thus, thermal stress does not lead to a premature failure of structural parts and thermal-related expansions are compensated.

According to another advantageous feature of the present invention, the end portion of the inner housing can have a C-shaped configuration. As a result, the end portion is wrapped around the flange collar along an arcuate course at a radius of about 180° to thereby realize a solid contact across the entire area. This has a positive effect on pressure tightness. Moreover, the C-shaped configuration of the end portion about the flange collar in axial and radial directions results in a formfitting connection which is able to especially compensate thermal expansion of the inner housing in relation to the fitting. A further advantage of the C-shaped configuration of the radially outwardly bent end portion is the manner in which the flange collar is wrapped around by the end portion of the inner housing. Stress peaks are hereby avoided which, in turn, leads to prevention of crack formation and/or fractures. The C-shaped configuration of the end portion has also a positive effect on the relative movement of the involved structural parts. For example, when exposed to changing temperatures, a marginal play between fitting and inner housing is rendered possible, while the press ring maintains a firm and pressure-tight seat at the end portion.

According to another advantageous feature of the present invention, the flange collar can have a bulged configuration in a radial direction of a rotation axis of the turbine wheel. In view of the geometric configuration of the inner housing in concert with the inner housing, a thermal expansion by the inner housing itself in axial direction can be compensated, and different thermal expansions in radial direction can be compensated by the C-shaped configuration of the end portion about the bulged flange collar. Advantageously, the flange collar can be configured to extend all around circumferentially about the fitting and can point towards the rotation axis of the turbine wheel.

According to another advantageous feature of the present invention, the inner housing can have at least one region bearing upon the fitting in a radial direction. Compared to the fitting, the inner housing is made of very thin material, such as sheet metal. As a result, it expands more rapidly, also because it is in direct contact with hot exhaust gas. In view of the radial support of the inner housing upon the fitting and the attained form fit, the inner housing is supported by the fitting when thermally expanding.

According to another advantageous feature of the present invention, the end portion of the inner housing can be arranged so as to point in an axial direction of a rotation axis of the turbine wheel away from the turbine housing. Advantageously, the end portion of the inner housing can be arranged to point also in a radial direction away from the rotation axis of the turbine wheel. This ensures that the flow of exhaust flowing through the turbocharger and/or fresh gas can never flow directly to the gap between the end portion and the fitting. As a result, pressure tightness is further enhanced.

According to another advantageous feature of the present invention, the press ring can be constructed for contact upon the end portion of the inner housing and/or an inner surface area of the fitting. The arrangement may hereby be formfitting or realized through friction engagement. When the press ring is brought into contact with an inner surface of the fitting and the end portion of the inner housing, the gap between end portion and fitting is further sealed.

In order to enhance pressure tightness and strength of the connection, the press ring and the end portion may be positioned to define a braze gap to allow realization of a material joint, e.g. a solder joint. The soldered joint prevents a rotation during production and/or processing of the turbocharger housing according to the present invention. In addition, the solder joint promotes heat conduction between the individual components, i.e. from press ring via inner housing to fitting. This exposes critical points of the component to less stress as a result of local heating or excess heat.

According to another advantageous feature of the present invention, a formfitting connection can be provided between contacting surfaces of the press ring and the fitting, with one of the contacting surfaces being the inner surface of the fitting. Advantageously, the formfitting connection is configured as a toothing, e.g. a micro toothing, between the contacting surfaces. This kind of toothing may be realized through roughening of one or both contacting surfaces. A rotation of the inner housing relative to the flange collar is prevented by the presence of the toothing.

According to another advantageous feature of the present invention, a formfitting connection, e.g. a toothing, may be provided between contacting surfaces of the flange collar and the end portion of the inner housing, and/or a formfitting connection, e.g. a toothing, such as a micro toothing, may be provided between contacting surfaces of the fitting on a turbine side thereof and the inner housing. Also this prevents a rotation or slipping, especially in the coupled region, during production and/or operation of the turbocharger according to the invention.

The toothings may involve axially and/or radially oriented toothings. Orientation is hereby to be understood to be an orientation of the tooth structure in the respective axial or radial direction. Suitably, any of the formfitting connections, configured as a toothing, can be soldered in addition.

According to another advantageous feature of the present invention, the press ring may be made of high-quality steel.

Advantageously, the press ring is made of a steel alloy which includes the following chemical constituents, expressed in weight-%:
Carbon (C) ≤0.20
Silicon (Si) ≤1.50 to 2.00
Manganese (Mn) ≤2.00
Phosphorus (P) ≤0.045
Sulfur (5) ≤0.015
Chromium (Cr) 19.00 to 21.00
Nickel (Ni) 11.00 to 13.00
Nitrogen (N) ≤0.11,
the remainder iron and incidental smelting-related impurities.

According to another advantageous feature of the present invention, the steel alloy can have a yield strength Rp0.2 of 230 N/mm. Currently preferred is a tensile strength of 550 N/mm$^2$ to 750 N/mm$^2$.

Other examples of steels include a steel of material number 1.4541 (X6CrNiTi18-10) or material number 1.4571 (X6CrNiMoTi17-12-2). When exhaust temperatures of >900° C. are involved, as encountered in Otto engines, the use of materials with material numbers 1.4841, 1.4845, 1.4876, 2.4851 and 2.4856 may be used as well for example. When expecting smaller exhaust temperatures (<900° C.), e.g. in a diesel combustion engine, it is also possible to use a material with the material number 1.4509 (X2CrTiNb18) or a material with the material number 1.4512 (X2CrTi12). Examples of other appropriate materials include those with material numbers 1.4521 or 1.4511.

An important aspect of the present invention is the fact that the fitting and the press ring are made of a same material so as to be subjected to a same thermal expansion behavior. This has a positive effect on the realized sealing action.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 shows a schematic illustration of a turbine housing according to the present invention.

DETAILED DESCRIPTION OF PREFERRED EMBODIMENTS

The depicted embodiment is to be understood as illustrative of the invention and not as limiting in any way. It should also be understood that the FIGURE is not necessarily to scale and that the embodiment may be illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a schematic illustration of a turbine housing according to the present invention, generally designated by reference numeral 1 and forming part of an exhaust-gas turbocharger, generally designated by reference numeral 2. The turbo housing 1 includes an inner housing 3 and an outer housing 4. The inner housing 3 is coupled to a fitting 5 for attachment of a bearing case, not shown in greater detail. In an area of a coupling region 6, the fitting 5 has a flange collar 7 which is bulged in radial direction R towards a rotation axis 8 of a turbine wheel (not shown).

The flange collar 7 is traversed by the inner housing 3 in axial direction A of the rotation axis 8 of a turbine wheel in the coupling region and has an end portion 9 which is bent radially outwards about the flange collar 7. The bent end portion 9 has a substantially C-shaped configuration 10. A press ring 11 is arranged at the end portion 9 to increase a press fit between the end portion 9 of the inner housing 3 and the flange collar 7 by establishing a formfitting and force-locking coupling 12 with an outer side of the bent end portion 9 and an inner surface 14 of the fitting 5.

Toothings, e.g. micro toothings 16, are provided between the inner surface 14 of the fitting 5 and the press ring 11 and/or between the bent end portion 9 and the flange collar 7 and/or between the inner housing 3 and the fitting 5 in a radial contact zone 15. A braze gap may optionally be provided between the press ring 11 and the outer side 13 of the bent end portion 9 for establishing a solder joint 17 therein.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A turbine housing of an exhaust-gas turbocharger, comprising:
    an outer housing;
    an inner housing;
    a tubular fitting formfittingly connected to the inner housing and having a flange collar for attachment of a bearing case of a turbine wheel, said inner housing traversing the fitting and having an end portion bent radially outwards about the flange collar; and
    a press ring arranged upon the end portion for additional positional fixation of the inner housing upon the flange collar.

2. The turbine housing of claim 1, wherein the end portion of the inner housing has a C-shaped configuration.

3. The turbine housing of claim 1, wherein the flange collar has a bulged configuration pointing in a radial direction of a rotation axis of the turbine wheel.

4. The turbine housing of claim 1, wherein the inner housing has at least one region bearing upon the fitting in a radial direction.

5. The turbine housing of claim 1, wherein the end portion of the inner housing is arranged so as to point in an axial direction of a rotation axis of the turbine wheel away from the turbine housing.

6. The turbine housing of claim 1, wherein the press ring is constructed for contact upon at least one of member selected from the group consisting of the end portion of the inner housing and an inner surface area of the fitting.

7. The turbine housing of claim 6, wherein the press ring is constructed for frictional engagement upon the member.

8. The turbine housing of claim 1, wherein the press ring and the end portion define a braze gap.

9. The turbine housing of claim 8, wherein the braze gap provides for a material joint.

10. The turbine housing of claim 9, further comprising a solder for introduction in the braze gap to provide a solder joint as the material joint between the press ring and the fitting.

11. The turbine housing of claim 1, further comprising a formfitting connection between contacting surfaces of the press ring and the fitting.

12. The turbine housing of claim 11, wherein one of the contacting surfaces is an inner surface of the fitting.

13. The turbine housing of claim 11, wherein the formfitting connection is configured as a toothing between the contacting surfaces.

14. The turbine housing of claim 11, further comprising a solder for providing a solder joint between the contacting surfaces.

15. The turbine housing of claim 1, further comprising a formfitting connection between contacting surfaces of the flange collar and the end portion of the inner housing.

16. The turbine housing of claim 15, wherein the formfitting connection is configured as a toothing between the contacting surfaces.

17. The turbine housing of claim 15, further comprising a solder for providing a solder joint between the contacting surfaces.

18. The turbine housing of claim 1, further comprising a formfitting connection between contacting surfaces of the fitting on a turbine side thereof and the inner housing.

19. The turbine housing of claim 18, wherein the formfitting connection is configured as a toothing between the contacting surfaces.

20. The turbine housing of claim 19, wherein the toothing is a micro toothing.

21. The turbine housing of claim 18, further comprising a solder for providing a solder joint between the contacting surfaces.

22. The turbine housing of claim 1, wherein the press ring is made of steel.

23. The turbine housing of claim 1, wherein the press ring and the fitting are made of a same material.

24. The turbine housing of claim 1, wherein the press ring is made of a steel alloy including the following chemical constituents, expressed in weight-%:
    Carbon (C) $\leq 0.20$
    Silicon (Si) $\leq 1.50$ to $2.00$
    Manganese (Mn) $\leq 2.00$
    Phosphorus (P) $\leq 0.045$
    Sulfur (S) $\leq 0.015$
    Chromium (Cr) $19.00$ to $21.00$
    Nickel (Ni) $11.00$ to $13.00$
    Nitrogen (N) $\leq 0.11$,
    the remainder iron and incidental smelting-related impurities.

25. The turbine housing of claim 24, wherein the, the steel alloy has a yield strength Rp0.2 of 230 N/mm and a tensile strength of 550 N/mm$^2$ to 750 N/mm$^2$.

* * * * *